P. T. HAMM.
ANTISKID DEVICE FOR TIRES.
APPLICATION FILED FEB. 21, 1910.

979,159.

Patented Dec. 20, 1910.
2 SHEETS—SHEET 1.

Witnesses:
Chas. W. La Rue
Allan H. Goose

Inventor:
Philip T. Hamm
by Wilbur M. Stone
Attorney.

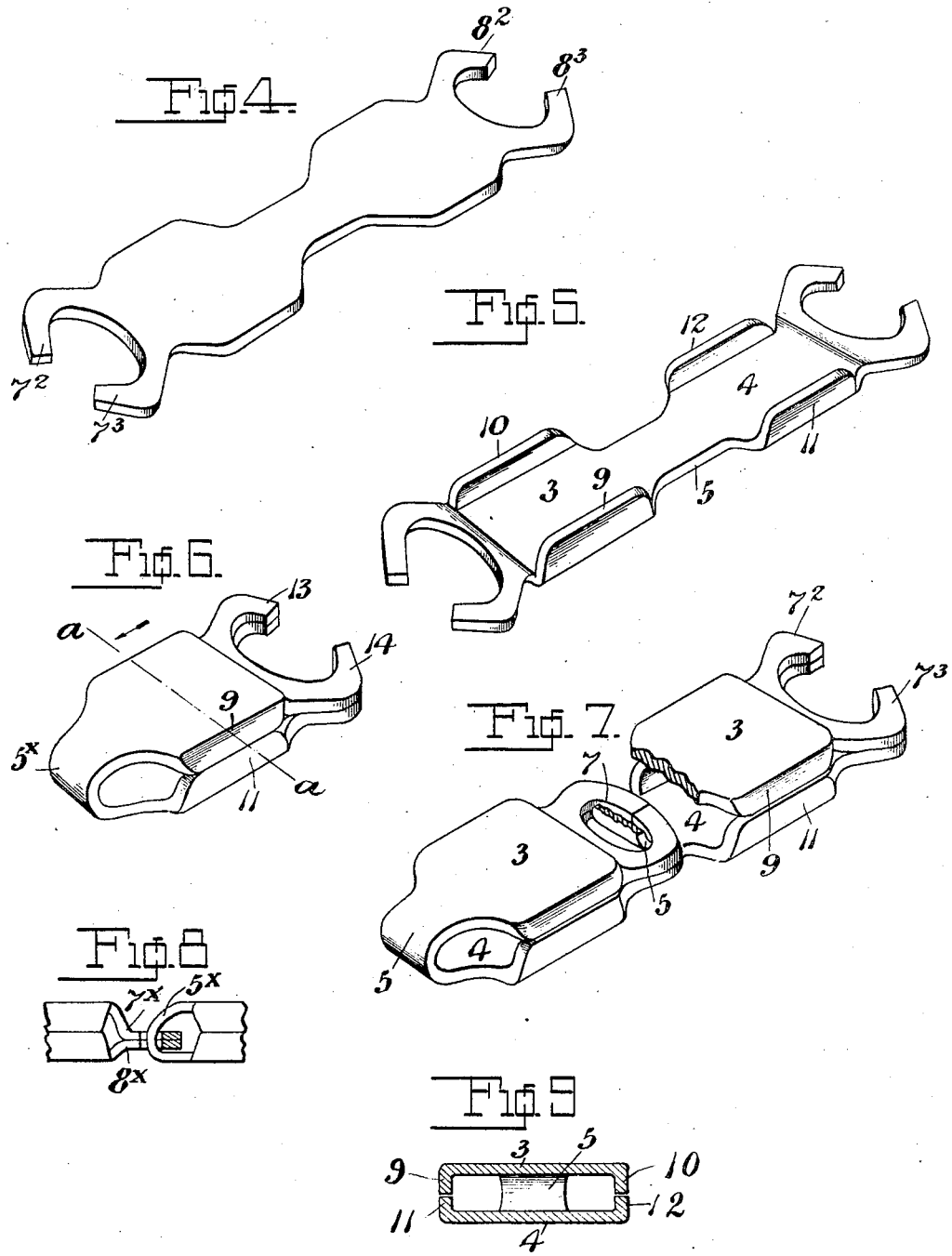

UNITED STATES PATENT OFFICE.

PHILIP T. HAMM, OF NEW YORK, N. Y., ASSIGNOR TO ATLAS CHAIN COMPANY, OF NEW YORK, N. Y., A CORPORATION OF NEW YORK.

ANTISKID DEVICE FOR TIRES.

979,159.

Specification of Letters Patent.  Patented Dec. 20, 1910.

Application filed February 21, 1910. Serial No. 545,024.

*To all whom it may concern:*

Be it known that I, PHILIP T. HAMM, a citizen of the United States, and a resident of New York city, in the county of Kings and State of New York, have invented certain new and useful Improvements in Antiskid Devices for Tires, of which the following is a specification.

This invention relates to anti-skid devices for tires commonly known as tire chains and used on tires of automobiles to prevent the slipping and skidding of the tires on the road.

The object of my invention is to furnish an improved cross member for the tread, consisting of links that can be simply and cheaply made from sheet metal blanks and comprising integral means for flexibly connecting the links together and having its tread surface suitably supported to provide holding means on the road and suitably reinforced against crushing.

Figure 1:
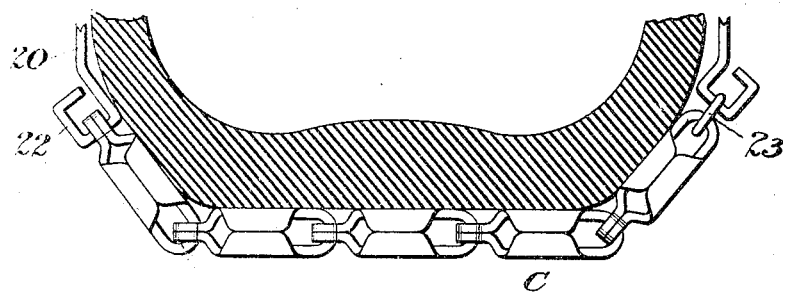
Figure 2:
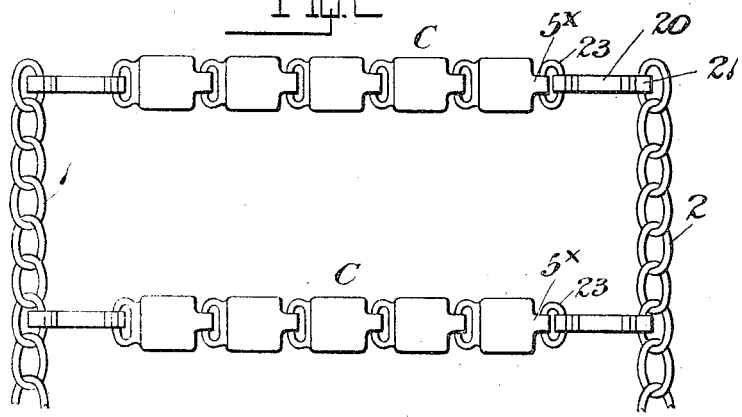
Figure 3:
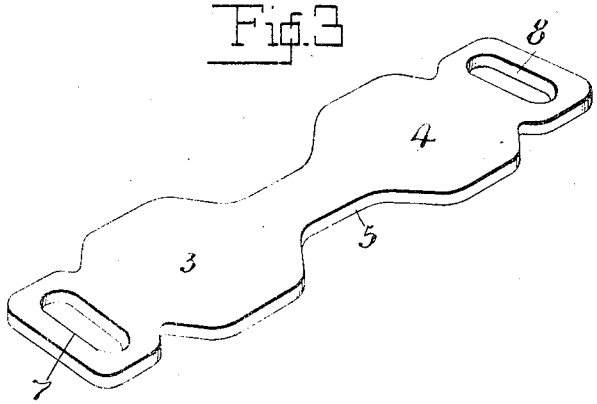

In the drawings accompanying this specification, my invention is illustrated in its preferred embodiment wherein—Figure 1 is a section of a portion of a tire showing the chain in position thereon and under compression from the weight of the machine. Fig. 2 is a plan view of a section of my device showing the side chains and two of the cross members. Fig. 3 shows a blank made from a piece of sheet metal from which each link is formed. Fig. 4 is a plan view showing the link with the end eyes opened. Fig. 5 shows the link with the side edges bent up. Fig. 6 shows the link with the flat ends bent over so that the edges of the sides are in engagement and bringing the two portions of the eye members together. Fig. 7 is a view of two of the links, one of which has its eye portions closed about the engaged portion of the other link. Fig. 8 is a section on line $a$—$a$ of Fig. 6 and Fig. 9 illustrates a modification of the eye portion of my improved link.

In Figs. 1 and 2 my improved chain as illustrated includes side members 1 and 2 which may be of ordinary chain construction. Cross members C lie between said side members and are connected thereto by suitable links as 20. Each cross member C is made up of a plurality of links, five being shown in the present embodiment. Each of these links is formed from a blank as shown in Fig. 3, comprising two flat portions 3 and 4 connected by a narrower portion 5 and at the outer ends of portions 3 and 4 are eye portions 7 and 8 respectively, having elongated transverse eyes of the same size and shape. To enable the assembly of said eyes into the bended portion of the link they are divided at their middle portions into two parts as $7^2$ and $7^3$ as to eye 7 and $8^2$ and $8^3$ as to eye 8. Opposite sides of flat portions of 3 and 4 are next bent to form lips or supports 9 and 10 as to portion 3 and 11 and 12 as to portion 4. The split eye portions are also bent upwardly to some extent so that in the later bending said eye portions will be brought together face to face. The partly bent blank is now folded at its narrower portion 5 (Fig. 6) and portions 9 and 11 and portions 10 and 12 respectively, brought together edge to edge thus bringing flat portions 3 and 4 into parallelism, but offset from each other. The split eyes also come together face to face in register as illustrated.

To assemble the links the eye forming portions 13 and 14 (Fig. 6) are brought adjacent to opposite sides respectively of the open loop $5^\times$ of another link and the portions 13 and 14 are forced inwardly to bring their ends together whereby the portion $5^\times$ is inclosed within the now restored eye as shown in Fig. 7. The adjacent links are thus articulated by integral means. At one end of chain C (Fig. 2), an elongated link 20 having eyes 21 and 22 at its respective ends, connects double eye portion 7 with the side chain and at the other end of chain C a similar elongated link is attached to the said chain C by connecting link 23 in engagement with bent portion $5^\times$ of said link.

Fig. 9 illustrates a modified arrangement of the eye portion of my improved link wherein eye portions $7^\times$ and $8^\times$ do not meet along the medial plane of the link, but between said medial plane and the lower face of the link. Narrow portion $5^\times$ of the connecting link is so bent as to present its connecting portion with the adjacent link in the offset plane of members $7^\times$, $8^\times$. Said offsetting of these connecting portions serve as a protection against abrasion in use.

I thus provide a cross member comprising as many of my improved links as desired, said links having a large engaging surface, strongly supported by their bent engaging edges thereby furnishing resistance against collapse. The hollow box construction supplies a maximum amount of gripping surface with a minimum amount of weight. Each link member is integral, of great rigidity, simple in construction and can be readily and economically made.

I claim:

1. In an anti-skid device for tires, a link formed from an integral blank, and comprising two offset parallel portions connected by a bent portion, the parallel portions having their side edges bent into engagement to support such portions offset.

2. In an anti-skid device for tires, a link formed from an integral blank, and comprising two offset parallel portions connected by a bent portion, the parallel portions having their side edges bent into engagement to support such portions offset, the links having integral articulating portions.

3. In an anti-skid device for tires, a link formed from an integral blank, and comprising two offset parallel portions connected by a bent portion, the parallel portions having their side edges bent into engagement to support such portions offset, and eye portions at the opposite end of the members from the said bent portions through which passes the bent portion of the adjacent link.

4. In an anti-skid device for tires, a link formed from an integral blank, and comprising two offset parallel portions connected by a bent portion, the parallel portions having their side edges bent into engagement to support such portions offset, and double eye portions at the opposite end of the members from the said bent portions through which passes the bent portion of the adjacent link.

5. In an anti-skid device for tires, a link formed from an integral blank, and comprising two offset parallel portions connected by a bent portion, the parallel portions having their side edges bent into engagement to support such parallel portions offset, and double eye portions at the opposite end of the members from the said bent portions through which passes the bent portion of the adjacent link, the eye portions being contiguous and offset from the outer faces of the parallel portions.

6. In an anti-skid device for tires, a link formed from an integral blank, and comprising two offset parallel portions connected by a bent narrower portion, the parallel portions having their side edges bent into engagement to support such parallel portions offset, and eye portions at the opposite end of the members from the said bent portions through which passes the bent portion of the adjacent link, the eye portions being divided to be opened and closed for connection with the said bent portions of the links.

7. In an anti-skid device for tires, a link formed from an integral blank, and comprising two offset parallel portions connected by a bent narrower portion, the parallel portions having their side edges bent into engagement to support such parallel portions offset, each said parallel portion having an eye portion at the opposite end from the said bent portions through which passes the bent portion of the adjacent link, the eye portions being contiguous and offset from the parallel portions.

Signed this eighteenth day of February, nineteen hundred and ten (1910) in the Park Row Building, New York, N. Y., before two subscribing witnesses.

PHILIP T. HAMM.

Witnesses:
 MAURICE H. CORMACK,
 ROBERT N. EVANS.